S. A. FLOREN.
SEED TESTER.
APPLICATION FILED FEB. 19, 1916.
1,202,174.
Patented Oct. 24, 1916.
2 SHEETS—SHEET 1.
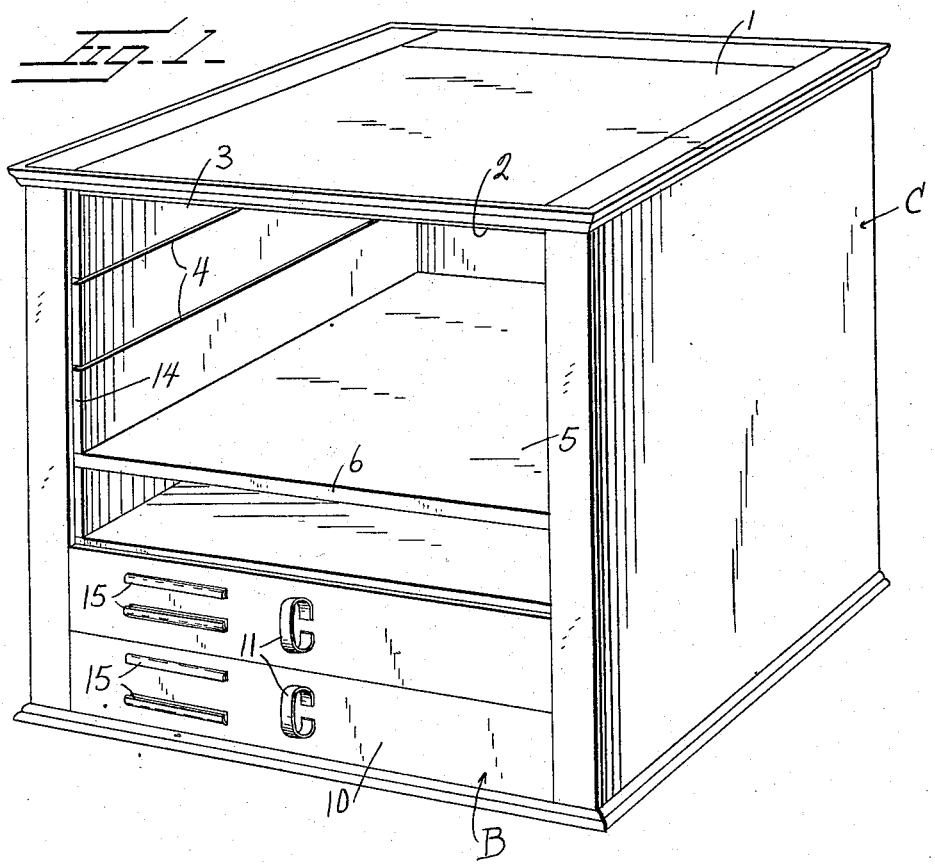
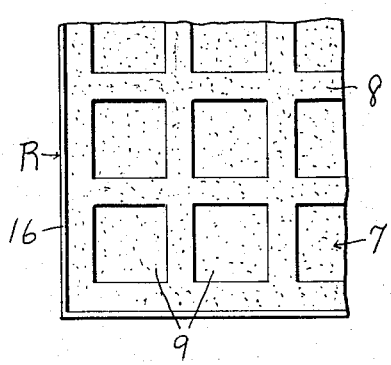
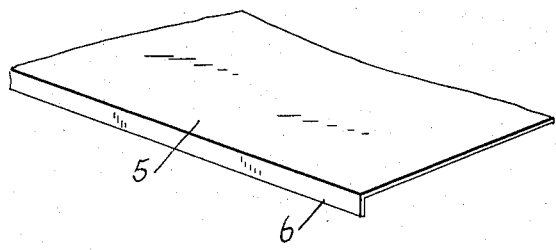
Inventor
S. A. FLOREN
By Watson E. Coleman
Attorney S. A. FLOREN.
SEED TESTER.
APPLICATION FILED FEB. 19, 1916.
1,202,174.
Patented Oct. 24, 1916.
2 SHEETS—SHEET 2.
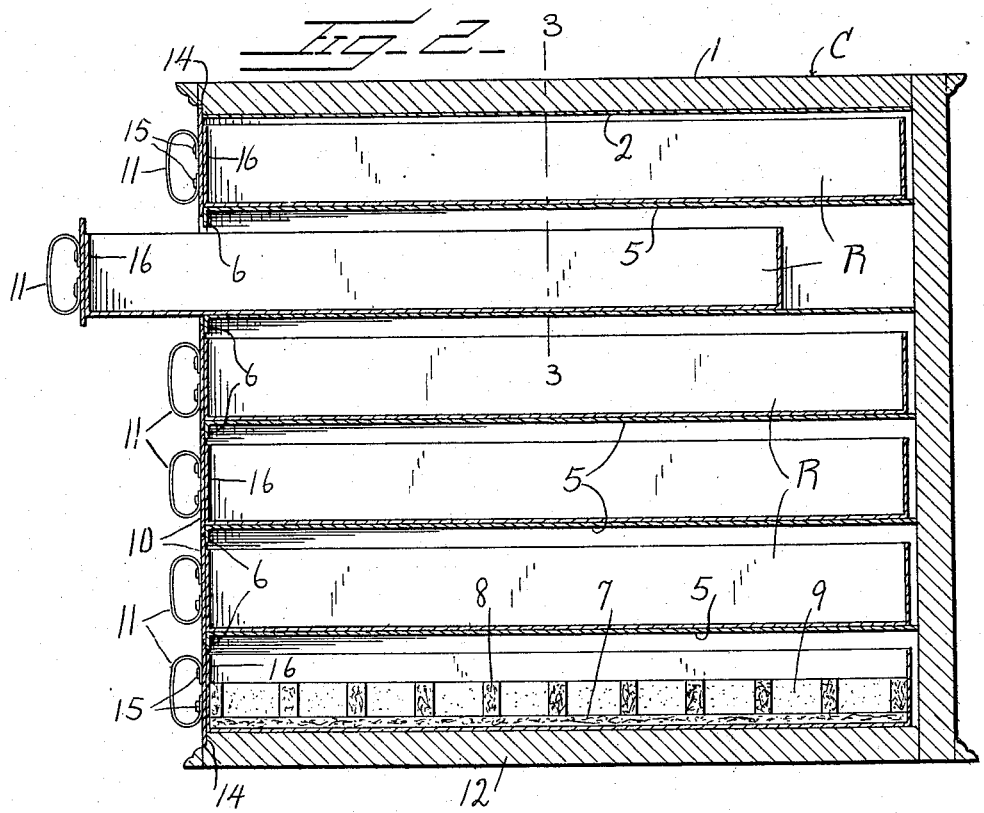
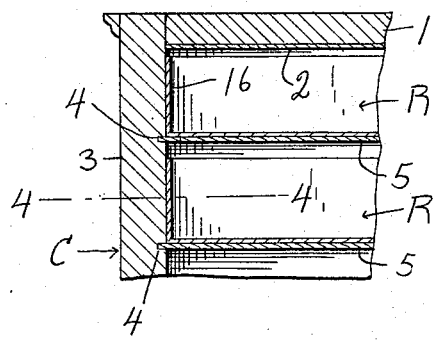
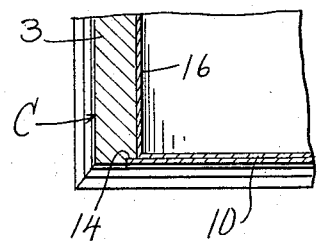
Inventor
S. A. FLOREN
By Watson E. Coleman
Attorney

UNITED STATES PATENT OFFICE.

SIEGWART A. FLOREN, OF BISMARCK, NORTH DAKOTA, ASSIGNOR TO CARUGUSS MANUFACTURING CO., OF BISMARCK, NORTH DAKOTA, A CORPORATION OF NORTH DAKOTA.

SEED-TESTER.

1,202,174.      Specification of Letters Patent.      Patented Oct. 24, 1916.

Application filed February 19, 1916. Serial No. 79,413.

*To all whom it may concern:*

Be it known that I, SIEGWART A. FLOREN, a citizen of the United States, residing at Bismarck, in the county of Burleigh and State of North Dakota, have invented certain new and useful Improvements in Seed-Testers, of which the following is a specification, reference being had to the accompanying drawings.

This invention relates to certain improvements in seed testers and it is an object of the invention to provide a novel and improved device of this general character comprising a plurality of separable units removably supported within a container or chamber and wherein the top wall of the container or chamber and the units serve to substantially seal said units when in applied position within the container or chamber.

The invention consists in the details of construction and in the combination and arrangement of the several parts of my improved seed tester whereby certain important advantages are attained and the device is rendered simpler, less expensive and otherwise more convenient and advantageous for use, all as will be hereinafter more fully set forth.

The novel features of the invention will hereinafter be definitely claimed.

In order that my invention may be the better understood, I will now proceed to describe the same with reference to the accompanying drawings, wherein—

Figure 1 is a view in perspective of a seed tester constructed in accordance with an embodiment of my invention, certain of the parts being removed; Fig. 2 is a vertical sectional view taken through the device as herein embodied; with one of the receptacles showing the absorbent members applied therein; Fig. 3 is an enlarged fragmentary sectional view taken substantially on the line 3—3 of Fig. 2; Fig. 4 is an enlarged detail sectional view taken substantially on the line 4—4 of Fig. 3; Fig. 5 is a fragmentary view in plan of one of the units as herein employed; and Fig. 6 is a fragmentary view in perspective of a shelf as herein disclosed.

As disclosed in the accompanying drawings, C denotes a container of predetermined configuration and preferably rectangular in plan and having its top wall 1 provided with a lining 2 of tin or other material impervious to moisture, and the opposed faces of the side walls 3 of the container C are provided with the transversely disposed guide grooves 4 arranged in predetermined vertical spaced relation, the grooves of one wall being horizontally alined with the grooves of the second wall.

5 denotes a shelf slidably engaged with a pair of horizontally alined grooves or guideways 4 and of such dimensions as to divide the interior or chamber of the container C into a plurality of compartments when said shelf is in applied position within the container. The face of the container C is open and the forward marginal portion of the shelf 5 is provided with a depending flange 6 co-extensive with the length of the shelf.

Mounted upon the shelf 5 is a receptacle R of a form in plan substantially identical with the form of the chamber or interior of the container C, and said receptacle R is provided with the upstanding marginal flanges 16 of predetermined height and has its top or upper face open. Arranged on the bottom of the receptacle R is an absorbent pad 7 such as a lamination or layer of blotter paper, and resting upon the pad 7 is the grid 8 also formed of absorbent material and having the openings 9 thereof preferably square in plan and arranged in ten series of parallel openings, each series comprising ten openings, the purpose of which being the same as set forth in the embodiment of my invention as disclosed in my co-pending application, Serial No. 60,014, filed November 6, 1915.

Secured to the outer face of the forward flange 16 is an elongated strip 10 preferably of metal which extends above the upper edge of the flange, below the bottom of the receptacle and beyond the opposite ends of the flange, whereby it will be perceived that the extended portions of the strip 10, when the shelf 5 is in applied position within the container C, will overlap the depending flange 4 of the shelf thereabove, will overlie the upper marginal portion of the forward flange of the receptacle immediately therebelow, and also overlie the adjacent vertical walls of the container C. By this arrangement it will be readily noted that when in applied position, each unit serves to seal the unit immediately therebelow. The uppermost receptacle R has the upwardly extending portion of its plate overlying the upper horizontal wall of the container C whereby it will be at once understood that the top or upper wall 1 of the container C serves to seal the uppermost receptacle R.

Each of the plates 10 has secured thereto at substantially its longitudinal center, a handle member 11 whereby the units may be readily removed from or applied within the container C when desired. It is also to be noted that the marginal portions of the top 1, the sides 3 and the bottom 12 of the container C, defining the open front of the container, are recessed, as at 14, so that when the several units are in applied position within the container C, the outer faces of the plates 10 will be substantially flush with the outer faces of the top 1, the side walls 3 and the bottom 12. It will be self-evident that the recess 14 in the bottom 12 is necessary in order to accommodate the depending extension of the plate 10, although it will be appreciated that the lowermost unit does not require the depending extension, although I have shown the same in the present embodiment of my invention so that all of the units may be readily interchangeable. I also find it of advantage to provide the plate 10 with means whereby a label may be applied thereto and as herein embodied, said means comprises the longitudinally disposed vertically spaced tongues 15 struck out from each of the plates 10 and affording guide-ways in which a desired label may be inserted.

From the foregoing description, it is thought to be obvious that a seed tester constructed in accordance with my invention is of an extremely simple and comparatively inexpensive nature and is particularly well adapted for use by reason of the convenience and facility with which it may be assembled, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A seed tester comprising a container having one face open and the marginal portions defining the open face being recessed, a plurality of shelves slidably arranged within the container and having their forward edges provided with depending flanges, receptacles removably inserted within the container through the open face thereof and resting on the shelves, each of said receptacles being provided with seed receiving pockets, and a plate secured to the forward face of each receptacle extending below the bottom thereof, beyond the opposite sides of the receptacle and above the receptacle, whereby said plate will overlie and contact with the depending flange of a shelf immediately therebeneath, will extend within the vertical recesses of the container and contact with the outer walls thereof and overlie and contact with the depending flange of the shelf immediately thereabove.

In testimony whereof I hereunto affix my signature in the presence of two witnesses.

SIEGWART A. FLOREN.

Witnesses:
 HENRY G. KLEINSCHNITZ,
 LOUIS H. CARNFEL.

Copies of this patent may be obtained for five cents each, by addressing the "Commissioner of Patents, Washington, D. C."